United States Patent Office 3,430,520
Patented Mar. 4, 1969

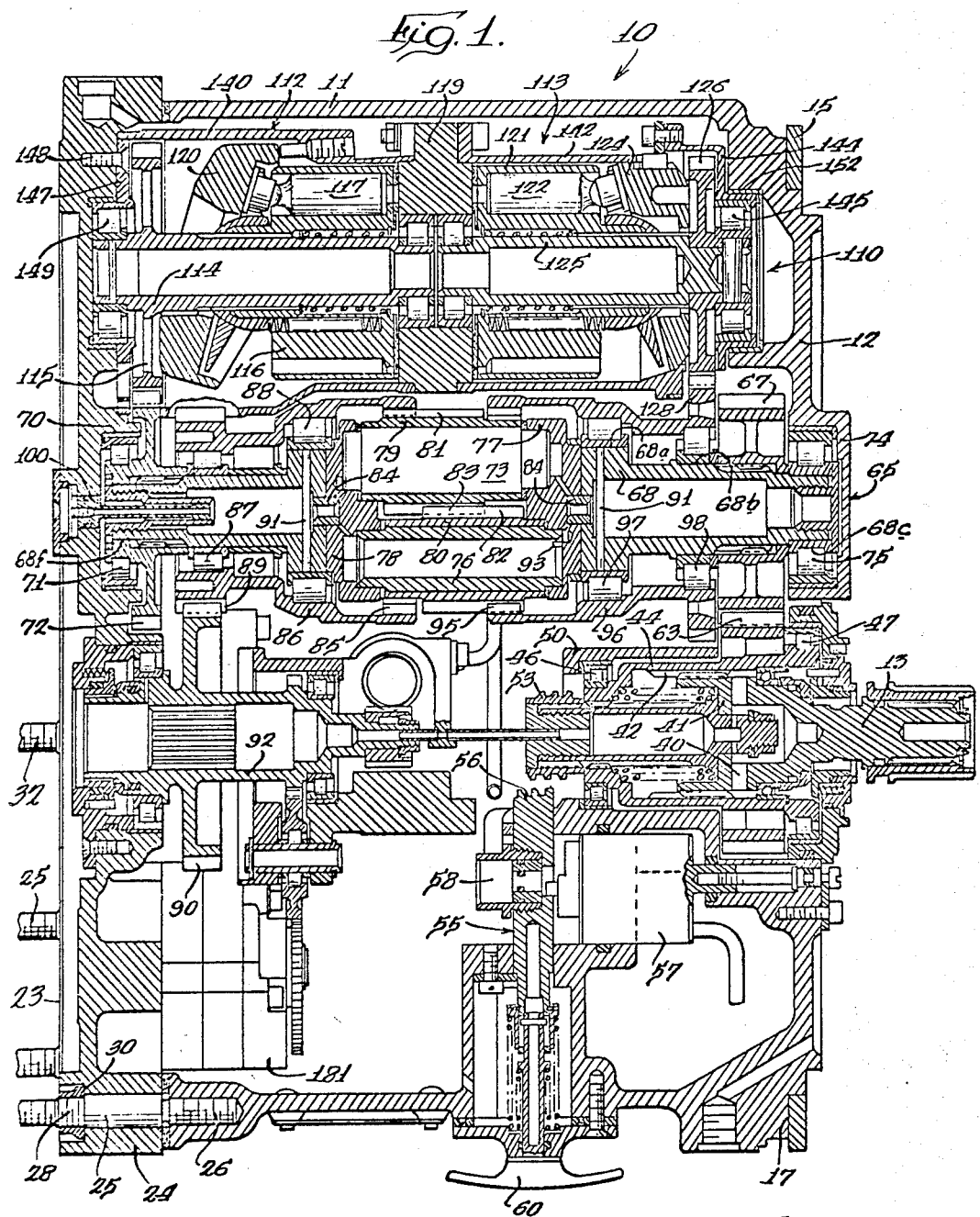

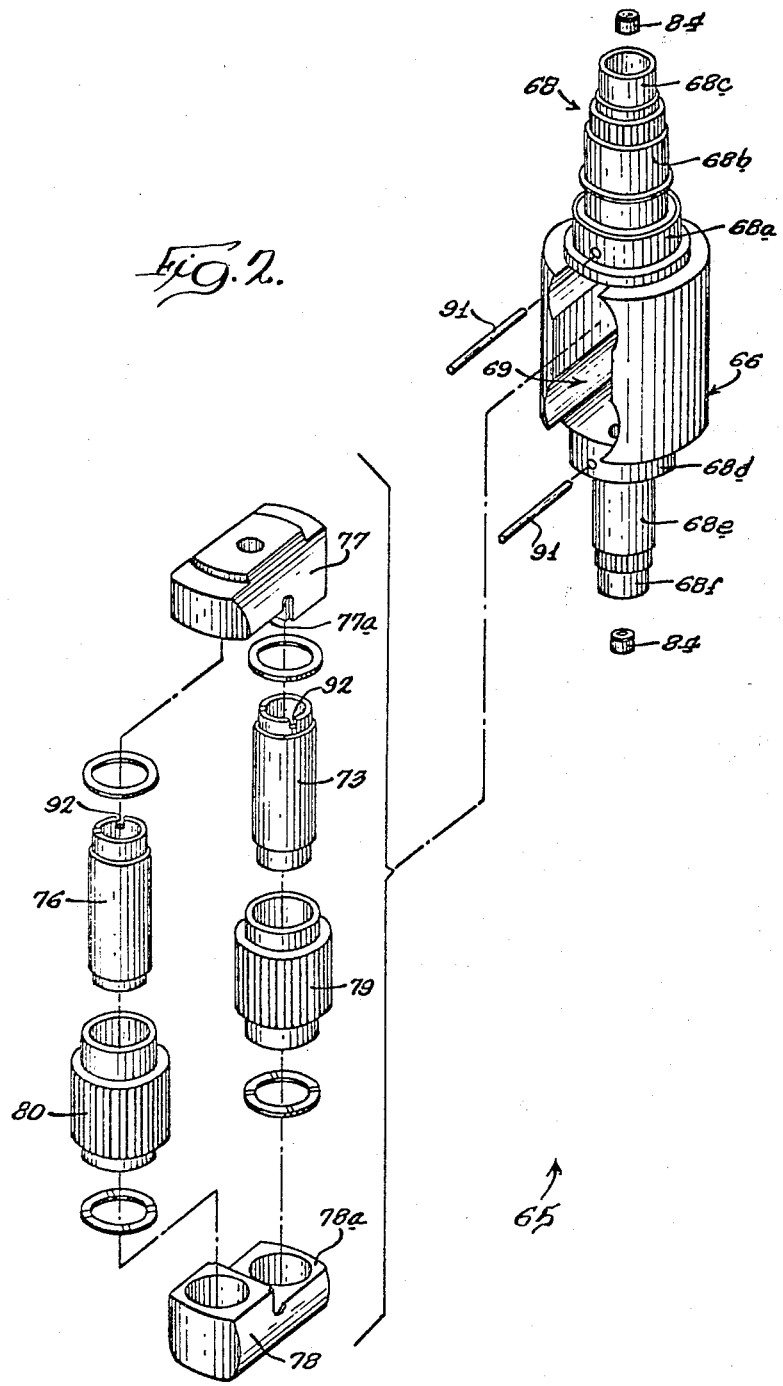

3,430,520
SPUR DIFFERENTIAL UNIT
Charles J. Gantzer, Rockford, Ill., assignor to Sundstrand Corporation, a corporation of Delaware
Original application Dec. 28, 1964, Ser. No. 421,483, now Patent No. 3,365,981, dated Jan. 30, 1968. Divided and this application July 28, 1967, Ser. No. 656,828
U.S. Cl. 74—714                6 Claims
Int. Cl. F16h 1/42

ABSTRACT OF THE DISCLOSURE

A gear differential having interengaging elongated pinions which are rotatably mounted in supporting blocks, the pinions and the blocks defining a unit which is releasably secured in a diametrical cavity in a carrier shaft by centrally disposed pins in the carrier shaft releasably engaging the support blocks.

Background of the invention

This application relates generally to transmissions and more particularly to a gear differential suitable for use in constant speed transmissions and other applications, and is a division of my copending application Ser. No. 421,-483, filed Dec. 28, 1964, now Patent No. 3,365,981, assigned to the assignee of the present invention. One problem often encountered in designing constant speed transmissions for aircraft is the confined envelope or space between the engine and the alternator or generator in which the transmission must be mounted. In addition to this, the transmission must be capable of delivering considerable power to the alternator under varying environmental conditions and over a wide range of input speed.

Summary of the invention

The present invention provides a transmission with a gear differential having a thin elongated shape to accommodate the limited envelope.

It is therefore a primary objective of the present invention to provide a new and improved sunless differential transmission having elongated sleeve ring gears providing a differential with an over-all length substantially greater than its diameter.

Another objective of the present invention is to provide a gear differential with pinion gears rotatably mounted in block like members defining a unit which may be readily and releasably inserted and fixed in an opening in a carrier shaft.

Brief description of the drawings

FIG. 1 is an irregular cross-sectional elevation of the assembled hydraulic differential transmission; and FIG. 2 is an exploded view illustrating the gear carrier in the mechanical differential.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Description of the preferred embodiment

An assembled constant speed transmission, employed herein as an exemplary application of the present gear differential, generally designated by the numeral 10, is shown in FIG. 1 as it would appear removed from the aircraft engine and alternator. A generally cylindrical housing member 11 has an integral closed end 12 adapted to be mounted adjacent the aircraft engine or gear box pad. A splined input shaft 13 is mounted centrally in the closed end 12 by suitable bearings and extends outwardly from the housing 11 so that it may be inserted into a hollow splined output shaft in the gear box.

For quickly attaching and detaching the hydraulic differential transmission 10 relative to the engine gear box (not shown) an annular adapter ring 15 is provided. As shown in FIG. 1 the ring is fastened in an annular shouldered recess 17 on the closed end 12 of the housing member 11 by suitable bolts (not shown). Formed on the periphery of the ring 15 are alternate tongues and grooves (not shown). An annular mounting ring (not shown) is provided on the engine gear box pad and has complementary tongues and grooves to those on the adapter ring 15. The differential hydraulic transmission 10 is located on the mounting ring with the input shaft 13 extending into the gear box by aligning the complementary tongues and grooves on the adapter ring 15 and the mounting ring. Then by relative rotation of the mounting ring and adapter ring a few degrees, the transmission is locked against the gear box pad.

As shown in FIG. 1 the open end 23 of the housing member 11 is closed by a generally flat mounting plate 24. The mounting plate 24 is secured to the open end 23 of the housing by annularly arranged studs 25 threaded at their ends 26 in the housing member 11, and threaded at an intermediate portion 28 for receiving nuts 30 which fasten the mounting plate 24 to the housing 11. The outer threaded ends 32 of the studs 25 extend from the mounting plate and are adapted to receive and attach an alternator or generator housing.

Turning now to the structural arrangement of the transmission components in the housing member 11, and viewing FIG. 1, the input shaft 13 has radial teeth 40 engaging and driving complementary teeth on a splined connector member 41 engages and drives spline 42 on a gear sleeve 44 mounted by suitable bearings 46 and 47 in an upwardly projection boss 50 formed integrally with the closed end 12 of the housing 11.

The connector 41, threaded sleeve 53, and a plunger assembly 55 form a quick disconnect device for uncoupling the input shaft 13 from the transmission in the case of an emergency, and form no part of the present invention and will for this reason not be functionally described in detail. It is sufficient for present purposes to state that a plunger 56 is released either by actuation of a solenoid 57 from the cockpit or by a thermal coupling 58 actuated automatically upon overheating of the transmission, to engage the plunger with the threaded sleeve 53 and disconnect the connector member 41 from the input shaft 13 so that the input shaft will no longer drive the transmission. A reset handle 60 located partially outside of the housing 11 and mounted therein permits the manual resetting of the plunger 56 after actuation by the solenoid 57.

The gear sleeve 44 carries a spur gear 63 which delivers input power to an elongated gear differential generally designated by the numeral 65, and shown in both FIGS. 1 and 2.

The gear differential 65, along with the hydraulic drive which controls the differential, serves to vary the output speed of the transmission relative to the input speed of shaft 13 to maintain a constant output speed. The power from the input shaft 13 and spur gear 63 to the elongated differential 65 is delivered through a spur gear 67 splined to a differential planet carrier shaft 68, which is the input member to the gear differential 65. The output end of the carrier shaft 68 is mounted in a cylindrical boss 70 in the mounting plate 24 by a suitable roller bearing 71 surrounding one end of a hub of a spur gear 72 splined to the end of the carrier shaft 68. The other end of the carrier shaft is mounted in a projecting boss 74 in the closed end 12 of the housing 11 by a suitable roller bearing 75.

Rotatable in the intermediate portion of the carrier shaft 68 are elongated pinion planets 79 and 80. The pinions 79 and 80 have teeth 81 and 82 interengaging at 83 so that they rotate about their own axes at equal speeds in opposite directions. The gear teeth 81 on pinion 79 engage teeth on an output ring gear 85 formed in an elongated stepped sleeve 86 mounted by bearings 87 and 88 on the carrier shaft 68. The sleeve 86 has a spur gear 89 formed integrally therewith which drives an output gear 90 formed integrally with a hollow internally splined output shaft 92.

Gear teeth 82 on pinion 80 engage a control ring gear 95 formed integrally within a stepped cylindrical control sleeve 96 rotatably mounted by bearings 97 and 98 on the carrier shaft 68. Lubrication is provided for the gear differential 65 by a lubricating tube 100 mounted in the plate 24 and extending into the carrier shaft 68. The tube 100 receives fluid from a hydraulic circuit (not shown in detail) and injects lubricating fluid into the hollow interior of the shaft 68.

The carrier shaft 68 includes an enlarged hollowed mid portion 66 and reduced opposed end portions, the upper end as shown in FIG. 2, and the right end as shown in FIG. 1, including a portion 68a for receiving bearing 97, a smaller portion 68b for receiving bearing 98 and a still smaller portion 68c for receiving bearing 75. The lower end of the shaft 68 as shown in FIG. 2 and the left end as shown in FIG. 1 includes a portion 68d for receiving bearing 88, a smaller portion 68e for receiving bearing 87 and a still smaller portion 68f on which the gear 72 and bearing 71 are fitted.

In order to rotatably mount the planetary pinions 79 and 80 in the carrier shaft 68, the enlarged portion 66 is hollowed diametrically therethrough to provide a cavity 69 adapted to receive an assemblage including both pinions as well as hollow shafts 73 and 76 therefor and bearing blocks or support blocks 77 and 78 for supporting the shafts.

The bearing blocks or support blocks 77 and 78 are fitted on the opposite reduced ends of the hollow pinion shafts 73 and 76 and the parts thus assembled fit closely into the cavity 69 with the blocks 77 and 78 at opposite ends of the cavity. When thus mounted, as shown in FIG. 1, the bearing blocks 77 and 78 are retained in position by hollow dowel pins 84 disposed coaxially with the shaft, and the pins 84 are in turn retained against dropout by elongate transverse pins 91.

In the specific embodiment illustrated, shafts 73 and 76 are held against rotation in the bearing blocks and the pinions 79 and 80 are rotatable respectively on the shafts. In order to retain the shafts against rotation, each is slotted at one end as illustrated at 92 in order to receive a suitable retention pin as at 93 in at least one of the bearing blocks. It will be understood that specifically different arrangements may be provided, as for example, by rotatably mounting the shafts and rotatably or nonrotatably supporting the pinions on the shafts.

While the shafts 73 and 76 may be substantially identical, and the pinions 79 and 80 may be substantially identical, as shown in FIG. 1, the assemblies, each including a shaft and pinion, are axially offset relative to each other so that adjacent overlapping ends of gear teeth 81 and 82 mesh with each other while opposed outer ends of the teeth are exposed and free to mesh respectively with the ring gear teeth 85 and 95. In order to facilitate assembly and to provide clearance for rotation of the exposed outer ends of the gear teeth 81 and 82, each of the bearing blocks 77 and 78 may be suitably recessed in the vicinity of the adjacent gear end as, for example, at 77a and 78a.

During assembly of the transmission, the entire gear differential 65 assembled together as shown in FIG. 1 is easily mounted in the housing as a unitary subassembly by inserting it or stacking it in the boss 70 of the mounting plate 24. After the other components have been mounted on the plate 24, the cover or housing member 11 is fastened thereover with the outwardly projecting boss 74 supporting the other end of the gear differential 65.

The speed ratio between each of the ring gears 85 and 95 and the carrier shaft 68 is 2 to 1. That is, if the output ring gear 85 is held stationary and the input shaft 13 rotated, the control ring gear 95 will rotate at twice the speed of the carrier shaft 68. And conversely, if the control ring gear 95 is held stationary, the output ring gear 85 will rotate at twice the speed of the carrier shaft 68. Since a constant output speed of gear 89 and output shaft 92 is desired, the ring gear 95 is constrained in a manner more fully described below by a hydraulic drive to produce a controlled output speed. It may readily be seen that if the ring gear 95 rotates in an opposite direction to the carrier shaft 68, this will increase the speed of rotation of the pinions 79 and 80 about their own axes and thereby increase the speed of rotation of the output ring gear 85 above the 2 to 1 ratio which would exist if the ring gear 95 were held stationary. On the other hand, if the control ring gear 95 is rotated in the same direction as the carrier shaft 68, the pinions 79 and 80 will rotate at a slower speed than if the ring gear 95 were stationary and thereby produce an output ring gear 85 speed less than twice that of the carrier shaft 68. When the control ring gear 95 is held stationary, the differential is in a so-called straight-through drive condition. In the above manner the control gear 95 serves to add or subtract speed from the differential.

For the purpose of controlling the speed and direction of rotation of the control ring gear 95, a hydraulic drive generally designated by the numeral 110 is provided as shown in FIG. 1. The hydraulic drive 110 consists of two back-to-back axial piston hydraulic units 112 and 113 mounted in the housing parallel to the gear differential 65 and closely adjacent thereto with their common axis lying in a different radial plane (i.e. radial with respect to input shaft 13). Each of the hydraulic units may act either as a pump or a motor depending upon the displacement control described in more detail below. The hydraulic unit 112 is of the variable displacement type and has a shaft 114 with a gear 115 formed integrally thereon which engages spur gear 72 which as noted above rotates with the input shaft 13. The shaft 114 is splined to and drives or is driven by a rotating cylinder block 116 carrying reciprocable axial pistons 117. An adjustable swashplate or cam member 120 reciprocates the pistons 117 in the cylinder block to deliver hydraulic fluid from the variable hydraulic unit 112 when it is acting as a pump. The cylinder block 116 slidably engages a valve plate 119 having two arcuate ports therethrough adapted to connect the units 112 and 113 in closed hydraulic circuit.

The fixed displacement hydraulic unit 113 consists of a rotating cylinder block 121 having reciprocable pistons 122 therein driven by a stationary swashplate member 124. Similarly to block 116, block 121 slidably engages the valve plate 119 and the pistons therein deliver and receive fluid through the arcuate ports in the valve plate 119. A drive shaft 125 is splined to and rotates with the cylinder block 121 and carries a spur gear 126 on the outboard end thereof which engages a spur gear 128 on the control ring gear sleeve 96. The inner adjacent ends of shafts 114 and 125 are supported in bearings in the valve plate 119.

With the swashplate in the position shown in FIG. 1 and with gear 115 rotating in a clockwise direction when viewed from the input shaft side of the transmission, the variable hydraulic unit 112 will act as a pump being driven from the input shaft 13 delivering high pressure fluid through the valve plate 119 and forcing the pistons 122 down the inclined surface of the fixed cam member 124 of the fixed hydraulic unit 113 thereby rotating shaft 125 and the control gear 95 in a direction to add speed to the differential 65. Conversely, when the swashplate 120 is reversed from the position shown in FIG. 1, the hydraulic unit 113 acts as a pump being driven by the control ring gear 95, which then rotates in an opposite direction as it is driven by the pinion 80, to deliver high pressure fluid to the variable hydraulic unit 112 which then acts as a motor or a metering unit retarding the free flow of high pressure fluid from the hydraulic unit 113 thereby constraining rotation of the ring gear 95 which is then rotating in a direction to subtract speed from the differential output.

A cam-like housing or cage for the hydraulic drive 110 is provided to facilitate assembly and conserve space in a limited envelope for the hydraulic transmission. The can housing consists of two cylindrical housing members 140 and 142 surrounding the hydraulic units 112 and 113, respectively, and having circular openings therein (not shown) to permit drainage of leakage fluid from the hydraulic units to the sump. A cover member 144 encloses the input end of the hydraulic drive unit and houses a bearing 145 which supports the fixed unit output shaft 125. The outboard end of housing member 140 fits snugly around a perforated circular pilot plate 147 secured to the mounting plate 24 by machine screws 148. The pilot plate 147 also receives the outer race of a bearing 149 which supports one end of the input shaft 114 in the variable displacement hydraulic unit 112.

I claim:
1. In a gear differential of the type having an input gear, an output gear and a control gear for varying the speed ratio of the input and output gears, a pinion carrier comprising: an elongate carrier shaft having an enlarged portion, a cavity extending in said enlarged portion; and a pinion assembly adapted to be inserted as a unit in the cavity including two opposed block members, two parallel shafts each having ends mounted in said blocks, a pinion mounted on each of said shafts for rotation with respect to the block members, said pinions interengaging so that rotation of one produces rotation of the other; and means for retaining the pinion assembly in the cavity including a member fixed in said carrier shaft and engaging one of the block members.

2. A gear differential of the type having an input gear, an output gear and a control gear for varying the speed ratio between the input and output gears, comprising: an elongate integral pinion carrier shaft rotatable about an axis and having an enlarged central portion, a diametral cavity extending through said enlarged central portion; a pinion assembly adapted to be inserted as a unit in the cavity including two opposed block members, two parallel shafts mounted in said block members, a pinion mounted on each of said shafts for rotation with respect to the block members, said pinions being axially offset and interengaging at their ends so that each of said pinions has a free end adjacent one of the block members, the assembly being constructed so that a portion of the pinions extends from the diametral cavity in the carrier shaft; means for retaining the assembly in the carrier shaft cavity including centrally disposed pins fixed in said carrier shaft adjacent said cavity and engaging each of said bearing blocks; a first hollow sleeve concentrically mounted for rotation on said carrier shaft and having an internal ring gear thereon engaging one of said pinions, and a second hollow sleeve concentrically mounted for rotation on said carrier shaft and having an internal ring gear thereon engaging the other pinion.

3. The combination as defined in claim 1 wherein said pinions are axially offset so that each may engage one of said gears without interfering with the other pinion.

4. The combination as defined in claim 1 wherein said cavity is in a central portion of said shaft and extends completely and diametrically through said shaft.

5. The combination as defined in claim 1 wherein said retaining means includes a centrally disposed pin in said carrier shaft extending into one of said blocks, and releasable means for preventing movement of said pin away from said one block.

6. The combination as defined in claim 5 wherein said releasable means includes a second pin in said carrier shaft transverse to and engaging said first pin.

References Cited

UNITED STATES PATENTS

| | | | |
|---|---|---|---|
| 331,644 | 12/1885 | Latta | 74—714 |
| 1,406,627 | 2/1922 | Elbertz | 74—714 |
| 2,178,613 | 11/1939 | Seeck | 74—714 X |
| 2,271,061 | 1/1942 | Castillo | 74—714 |
| 2,400,728 | 5/1946 | Akers | 74—714 X |
| 2,788,679 | 4/1957 | Mott | 74—714 |

DONLEY J. STOCKING, *Primary Examiner.*

T. C. PERRY, *Assistant Examiner.*

U.S. Cl. X.R.

74—421